United States Patent [19]

Yagi et al.

[11] 4,182,285
[45] Jan. 8, 1980

[54] CYLINDRICAL TORCH PASSAGE CONSTRUCTION FOR INTERNAL COMBUSTION ENGINE

[75] Inventors: Shizuo Yagi, Asaka; Isao Fujii, Hasuda; Masayasu Nishikawa, Tokyo, all of Japan

[73] Assignee: Honda Giken Kogyo Kabushiki Kaisha, Tokyo, Japan

[21] Appl. No.: 890,511

[22] Filed: Mar. 27, 1978

[51] Int. Cl.² ............................................. F02B 23/00
[52] U.S. Cl. ............................. 123/75 B; 123/191 S; 123/32 ST; 123/32 SP; 123/32 C
[58] Field of Search ............ 123/191 S, 191 SP, 75 B, 123/32 ST, 32 SP, 32 C, 32 K, 32 L

[56] References Cited

U.S. PATENT DOCUMENTS

| | | | |
|---|---|---|---|
| 2,380,615 | 7/1945 | Sheppard | 123/32 K |
| 2,804,858 | 9/1957 | Schilling | 123/32 C |
| 3,832,984 | 9/1974 | Taguchi | 123/75 B |
| 3,853,097 | 10/1974 | Kume | 123/32 SP |
| 4,004,563 | 1/1977 | Nakamura | 123/32 K |
| 4,076,000 | 2/1978 | Takao | 123/191 S |
| 4,098,246 | 7/1978 | Noguchi | 123/191 S |
| 4,116,191 | 9/1978 | Yanagihara | 123/191 S |

*Primary Examiner*—Ronald H. Lazarus
*Attorney, Agent, or Firm*—Lyon & Lyon

[57] ABSTRACT

An internal combustion piston engine has a main combustion chamber and an auxiliary combustion chamber connected by a torch passage, which is cylindrical end to end. Lean mixture is supplied to the main combustion chamber and rich mixture is supplied to the auxiliary combustion chamber. A spark plug ignites the mixture in the auxiliary combustion chamber, causing a torch flame to be projected through the torch passage into the main combustion chamber near its center. Suction conduits, smaller in diameter and total area than the torch passage, extend from a peripheral portion of the main chamber and intersect the torch passage between its ends. Movement of the burning gases through the torch passage aspirates a flow of mixture from the main combustion chamber through the suction conduits into the torch passage.

3 Claims, 2 Drawing Figures

CYLINDRICAL TORCH PASSAGE CONSTRUCTION FOR INTERNAL COMBUSTION ENGINE

The device of this invention is similar in many respects to the disclosure of the copending application of Yagi et al Ser. No. 890,514 entitled "Torch Passage Construction for Stratified Charge Engine" filed of even date herewith.

This invention relates to a four-cycle internal combustion piston engine and its object is to reduce CO and HC emissions as well as $NO_x$ emission in the exhaust of the engine, as well as to improve fuel consumption. These emission characteristics take place over the entire range of operation loads on the engine.

Engines of this type employ a first carburetor to supply a relatively lean air-fuel mixture to the main combustion chamber and a second carburetor to supply relatively rich air-fuel mixture to the auxiliary combustion chamber. A torch passage extends from the auxiliary combustion chamber to the main combustion chamber and has an outlet end positioned near the center of the main combustion chamber. A spark plug communicates with the auxiliary combustion chamber.

In accordance with this invention, suction conduits intersect a cylindrical torch passage at a location between its ends and these suction conduits communicate with a peripheral portion of the main combustion chamber. At the end of the compression stroke of the piston a spark plug communicating with the auxiliary combustion chamber ignites the mixture therein and sends a burning mixture or torch flame through the torch passage and into the main combustion chamber to ignite the relatively lean mixture therein. This flow through the torch passage induces a flow of mixture from the main combustion chamber through the suction conduits and into the torch passage. The combustion in the main chamber is improved for all loading conditions of the engine, from idling to full load, and this results in improvement of HC and $NO_x$ emissions.

Other objects and advantages will appear hereinafter.

Figure 1:
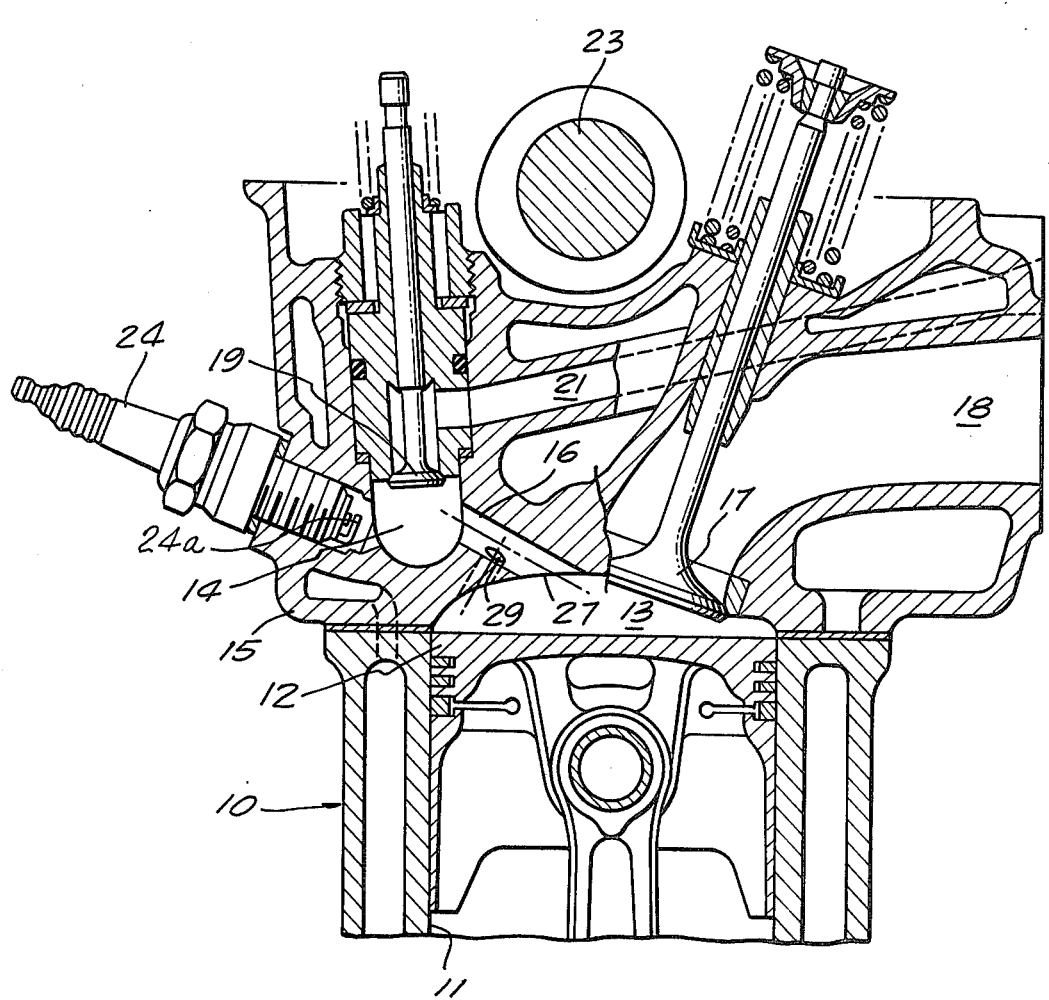
FIG. 1 is a sectional elevation partly broken away showing a preferred embodiment of this invention.
Figure 2:
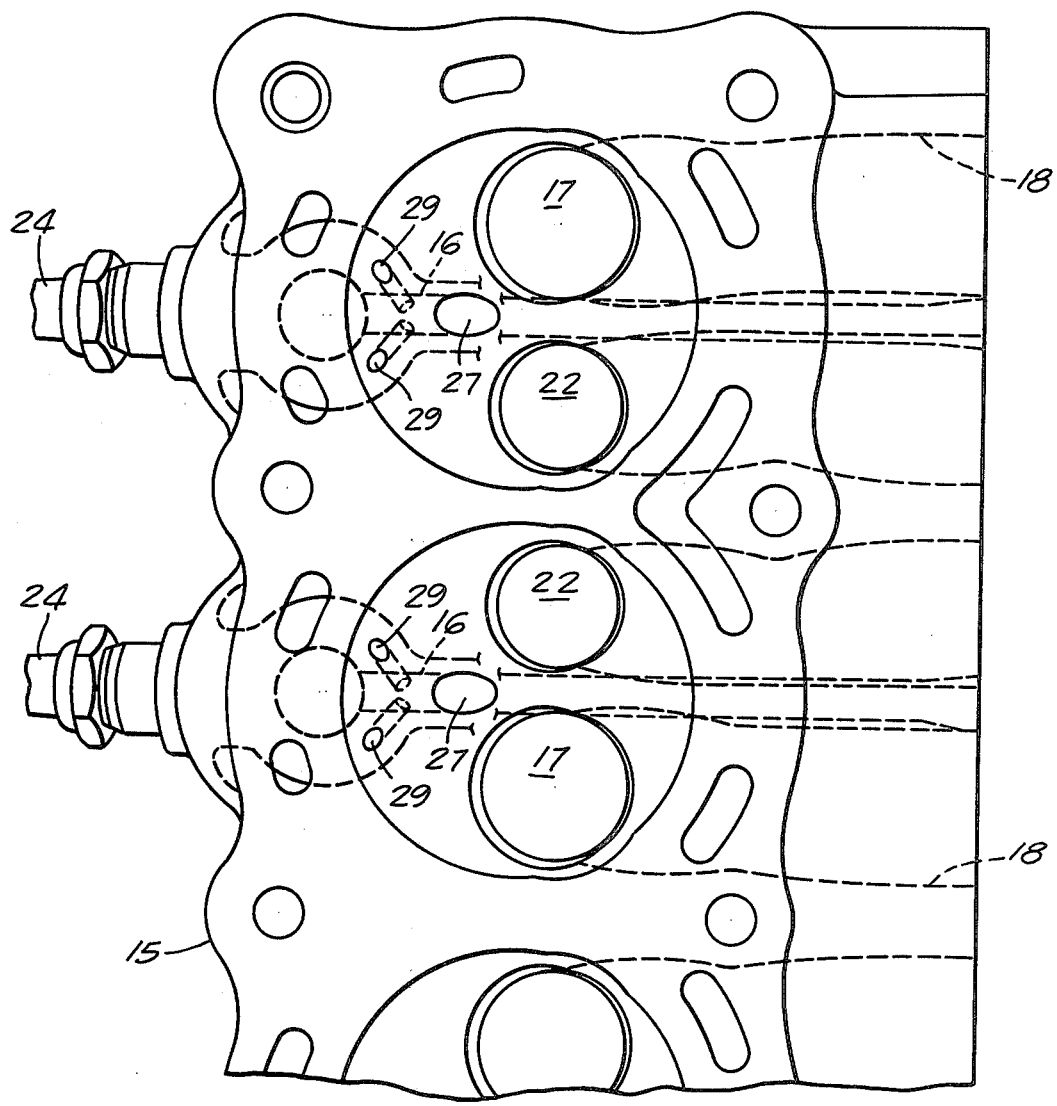
FIG. 2 is a view of the underside of the cylinder head of the engine, partly broken away, and showing the combustion chambers.

Referring to the drawings, the internal combustion engine generally designated 10 is provided with a cylinder 11 and a piston 12, the latter forming one wall of the main combustion chamber 13. An auxiliary combustion chamber 14 is mounted in the engine head 15 and is connected to the main combustion chamber 13 by means of the torch passage 16 in the engine head 15. A main intake valve 17 controls the flow of relatively lean mixture from a first carburetor, not shown, which supplies the main intake passage 18. An auxiliary intake valve 19 controls the relatively rich mixture supplied by a second carburetor, not shown, through the auxiliary intake passage 21. An exhaust valve 22 (see FIG. 2) is also provided for the main combustion chamber 13. All three valves 17, 19 and 22 are operated from the cam shaft 23 by means of conventional mechanism, not shown. A spark plug 24 communicates with the auxiliary combustion chamber 14. The torch passage 16 is positioned at a location remote from the spark plug electrodes 24a.

The torch passage 16 is cylindrical end to end, one end communicating with the auxiliary combustion chamber and the other end 27 communicating with the main combustion chamber 13 near the center thereof. Suction conduits 29 intersect the torch passage 16. The suction conduits 29 diverge symmetrically with respect to the central torch passage 16. All portions of the torch passage 16 are larger in diameter than the suction conduits 29.

The angle between the axis of the torch passage 16 and the axis of each suction conduit 29 is such as to produce the aspiration effect; ordinarily the angle may lie in the range of 80° to 120°. The ends of the suction conduits communicating with the main combustion chamber 13 are located in the outer periphery of that chamber, that is, the space lying outside a circle having one-half the diameter of the main combustion chamber 13 and concentric therewith.

In operation, a relatively lean air-fuel mixture is drawn into the main combustion chamber 13 from the main intake passage 18 during the intake stroke of the piston 12. At the same time relatively rich air-fuel mixture is drawn into the auxiliary combustion chamber 14 from the auxiliary intake passage 21. At the end of the compression stroke of the piston the spark plug 24 ignites the mixture in the auxiliary combustion chamber 14, causing a flame of burning mixture to pass from the auxiliary chamber 14 through the torch passage 16 and into the main combustion chamber 13 to burn the lean mixture therein.

Movement of the burning gases through the torch passage 16 causes a flow of mixture from the main combustion chamber 13 to pass through the suction conduits 29 and into the torch passage 16 by aspiration. This movement of lean mixture from the peripheral portion of the main combustion chamber 13 through the suction conduits 29 has been found to cause a double burning sequence which produces a marked improvement in emissions of CO, HC and $NO_x$. Experimental data from a test engine show that burning is first initiated in the main combustion chamber 13 near the outlet 27 of the torch passage 16. Combustion then spreads from the center of the main combustion chamber 13 toward the periphery thereof.

A second burning sequence of the same nature follows very shortly thereafter. Induction of the unburned mixture through the suction conduits 29 from the outer periphery of the main combustion chamber 13 is an important feature of this invention. This unburned mixture is not initially reached by the flame from the torch passage 16 and therefore aspiration of this unburned mixture through the suction conduits 29, aided by pressure increase in the main combustion chamber 13, results in improved combustion in the outer periphery of the main combustion chamber 13. This in turn reduces CO, HC and $NO_x$/emissions in the exhaust gases. The overall air-fuel ratio is on the lean side of the stoichiometric ratio and therefore good fuel economy is achieved.

Having fully described our invention, it is to be understood that we are not to be limited to the details herein set forth but that our invention is of the full scope of the appended claims.

We claim:

1. In an internal combustion piston engine, the combination of: walls forming a main combustion chamber, a piston forming one wall of said chamber, means forming an auxiliary combustion chamber, a spark plug having electrodes communicating with said auxiliary combustion chamber, means including a main intake valve for supplying a relatively lean air-fuel mixture to said main combustion chamber, means including an auxiliary intake valve for supplying a relatively rich air-fuel mixture to said auxiliary combustion chamber, a cylindrical torch passage extending from said auxiliary combustion chamber to said main combustion chamber and having an outlet end positioned near the center of said main combustion chamber, said cylindrical torch passage being positioned at a location remote from said spark plug electrodes, and at least one suction conduit intersecting said cylindrical torch passage at a location between its ends and extending to a peripheral zone of said main combustion chamber, the cross section area of said torch passage being greater than that of said suction conduit, whereby movement of burning air-fuel mixture through said torch passage aspirates a flow of air-fuel mixture from said main combustion chamber through said suction conduit and into said torch passage.

2. The combination set forth in claim 1 in which a plurality of suction conduits are provided, said suction conduits diverging symmetrically from said cylindrical torch passage.

3. The combination set forth in claim 1 in which a pair of suction conduits is provided, said suction conduits diverging symmetrically from said cylindrical torch passage.

* * * * *